United States Patent
Azais et al.

(10) Patent No.: US 9,773,620 B2
(45) Date of Patent: Sep. 26, 2017

(54) ELECTROCHEMICAL SUPERCAPACITOR DEVICE MADE FROM AN ELECTROLYTE COMPRISING, AS A CONDUCTIVE SALT, AT LEAST ONE SALT MADE FROM AN ALKALI ELEMENT OTHER THAN LITHIUM

(71) Applicant: COMMISSARIAT À L'ÉNERGIE ATOMIQUE ET AUX ÉNERGIES ALTERNATIVES, Paris (FR)

(72) Inventors: Philippe Azais, Saint Egreve (FR); Johann Lejosne, Lentigny (FR); Matthieu Picot, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 2 days.

(21) Appl. No.: 14/785,207

(22) PCT Filed: Apr. 22, 2014

(86) PCT No.: PCT/EP2014/058130
§ 371 (c)(1),
(2) Date: Oct. 16, 2015

(87) PCT Pub. No.: WO2014/173891
PCT Pub. Date: Oct. 30, 2014

(65) Prior Publication Data
US 2016/0071658 A1 Mar. 10, 2016

(30) Foreign Application Priority Data

Apr. 24, 2013 (FR) ..................... 13 53753

(51) Int. Cl.
| | |
|---|---|
| *H01G 11/04* | (2013.01) |
| *H01G 11/30* | (2013.01) |
| *H01G 11/60* | (2013.01) |
| *H01G 11/26* | (2013.01) |
| *H01G 11/34* | (2013.01) |
| *H01G 11/38* | (2013.01) |
| *H01G 11/62* | (2013.01) |
| *H01G 11/68* | (2013.01) |

(52) U.S. Cl.
CPC ............ *H01G 11/04* (2013.01); *H01G 11/26* (2013.01); *H01G 11/30* (2013.01); *H01G 11/34* (2013.01); *H01G 11/38* (2013.01); *H01G 11/60* (2013.01); *H01G 11/62* (2013.01); *H01G 11/68* (2013.01); *Y02E 60/13* (2013.01); *Y02T 10/7022* (2013.01)

(58) Field of Classification Search
None
See application file for complete search history.

(56) References Cited

U.S. PATENT DOCUMENTS

| | | | |
|---|---|---|---|
| 6,019,803 A * | 2/2000 | Oskam | H01G 11/50 29/623.1 |
| 6,671,166 B1 | 12/2003 | Penneau et al. | |
| 2006/0209493 A1 | 9/2006 | Fujino et al. | |
| 2007/0053141 A1 | 3/2007 | Fujino | |
| 2009/0130565 A1* | 5/2009 | Matsui | H01G 9/038 429/326 |
| 2009/0290287 A1 | 11/2009 | Lipka et al. | |
| 2011/0157773 A1 | 6/2011 | Sasaki | |
| 2012/0064388 A1* | 3/2012 | Whitacre | H01M 10/0585 429/160 |
| 2012/0270102 A1* | 10/2012 | Whitacre | H01G 11/24 429/205 |
| 2013/0020999 A1* | 1/2013 | Whitacre | H01M 14/00 320/118 |
| 2013/0330617 A1 | 12/2013 | Yoshimura et al. | |

FOREIGN PATENT DOCUMENTS

| | | |
|---|---|---|
| FR | 2759211 A1 | 8/1998 |
| JP | 200850258 A | 3/2008 |
| JP | 5058381 B1 | 10/2012 |
| WO | 9521466 A1 | 8/1995 |
| WO | 0002215 A1 | 1/2000 |
| WO | 2010024327 A1 | 3/2010 |
| WO | 2012115050 A1 | 8/2012 |

* cited by examiner

*Primary Examiner* — Dion R Ferguson
(74) *Attorney, Agent, or Firm* — Hultquist, PLLC; Mary B. Grant

(57) ABSTRACT

The invention relates to a device of the hybrid supercapacitor type comprising at least one cell comprising:
a porous positive electrode comprising activated carbon;
a negative electrode comprising a carbonaceous material capable of inserting an alkaline element other than lithium, this carbonaceous material being different from the activated carbon used at the positive electrode; and
a non-aqueous electrolyte comprising a salt selected from salts of an alkaline metal other than lithium.

24 Claims, 6 Drawing Sheets

ELECTROCHEMICAL SUPERCAPACITOR DEVICE MADE FROM AN ELECTROLYTE COMPRISING, AS A CONDUCTIVE SALT, AT LEAST ONE SALT MADE FROM AN ALKALI ELEMENT OTHER THAN LITHIUM

CROSS-REFERENCE TO RELATED APPLICATIONS

This application is a U.S. national phase under the provisions of 35 U.S.C. §371of International Patent Application No. PCT/EP14/58130 filed Apr. 22, 2014, which in turn claims priority of French Patent Application No. 1353753 filed Apr. 24, 2013. The disclosures of such international patent application and French priority patent application are hereby incorporated herein by reference in their respective entireties, for all purposes.

TECHNICAL FIELD

The present invention relates to electrochemical devices of the specific supercapacitor type comprising at least one cell comprising a specific pair of electrodes (a negative electrode and positive electrode) associated with a specific electrolyte giving the possibility of accessing high energy density.

These devices find their application in many fields, requiring rapid supply of high energy densities, notably in the power supply of onboard systems with a small thickness, such as credit cards, smart labels, in the power supply of mobile phones or further in the power supply of electric vehicles.

STATE OF THE PRIOR ART

Supercapacitors (which may also be described as supercapacitances) are devices for storing energy with which it is possible to obtain intermediate power density and energy density between those obtained for electrochemical batteries and standard electrolytic capacitors and have the particularity of restoring more rapidly energy than an electrochemical battery is able to do so.

From the point of view of the operation, supercapacitors operate on the principle of the electrochemical double layer, whence the sometimes encountered name of "electrochemical double layer capacitor" (also known under the acronym of EDLC), i.e., in other words, on the principle of storing energy by distributing, within at least one cell, the ions from an electrolyte in the vicinity of the surface of two porous electrodes (a positive electrode and a negative electrode, respectively) impregnated with an ionic electrolyte, separated by a porous membrane giving the possibility of ensuring electron insulation between the electrodes, while allowing an easy passage of the ions of the electrolyte.

Thus, more specifically, a cell based on a supercapacitor may be summarized by the following elements:
- a positive electrode;
- a positive electrode/electrolyte interface forming an electrochemical double layer;
- a porous membrane impregnated with said electrolyte;
- a negative electrode; and
- a negative electrode/electrolyte interface forming an electrochemical double layer.

Because of the existence of both of these interfaces each forming an electrochemical double layer, a supercapacitor may be considered as the association in series of two capacitors, one with the positive electrode and the other one with the negative electrode, both of these capacitors being created by applying a current on the terminals of the supercapacitor, which generates a space charge area at both electrode-electrolyte interfaces, the energy being thereby stored electrostatically.

Supercapacitors are known, for which both electrodes (positive electrode and negative electrode) are both based on activated carbon and the electrolyte based on lithium ions, this type of supercapacitor having a high power density, high cyclability but however low energy density related both to the average capacity of the supercapacitor (the latter being of the order of 10 Wh/kg) and to the operating voltage, the limiting factors being the following:
- the operating voltage should be relatively high (of the order of 2.7 to 2.8 V) in order to preserve a long lifetime and controlled self-discharge, the self-discharge phenomenon being higher than that of batteries;
- the volume capacity of the electrode materials; and
- the passive constituents (such as collectors, separators, casing), which may be detrimental to the performances of the device, and which leads the designers to a reduction of these types of constituents.

With view to meeting the requirement of increasing the energy density, supercapacitors have been developed located between conventionally used supercapacitors based on activated carbon and batteries, which led the latter to be described as asymmetrical or hybrid supercapacitors, specifically because one of the electrodes is formed from a rechargeable battery material (conventionally, the negative electrode) and the other is formed on the basis of activated carbon (conventionally, the positive electrode), the electrolyte located between both of these electrodes being an aqueous electrolyte conventionally.

In other words, this type of supercapacitor operates on the principle according to which the storage of charges at the negative electrode occurs via a redox reaction, while the storage of charges at the positive electrode occurs via the formation of an electrochemical double layer.

Hybrid supercapacitors of this type are notably explained in:
- WO 95/21466 describing supercapacitors based on the principle of dissymmetrical electrodes, a first electrode comprising a carbonaceous material, such as glassy carbon, activated carbon, center of the formation of an electric double layer and a second metal electrode based on ruthenium, rhodium, palladium, osmium, iridium, cobalt, nickel, manganese, iron, platinum and alloys thereof, this second electrode being the center of a redox reaction;
- WO 00/02215 describing supercapacitors also based on the principle of dissymmetrical electrodes, a first electrode comprising a carbonaceous material as a nanoporous carbon and a second porous metal electrode, such as an electrode in nickel, cobalt and/or lead.

These systems mainly operating in an aqueous medium, result in the following drawbacks:
- a low operating voltage of the system (generally, less than 2.2 V), which requires the formation of an energy storage module consisting in an assembly of a certain number of cells in order to obtain an output voltage, sufficient for powering a device, with the drawback that this generates a non-negligible additional series resistance in power energy storage systems;
- a relatively high cost, which makes them quasi only accessible for niche sectors.

Other hybrid systems have also been developed, wherein both electrodes are made on the basis of a carbonaceous material, notably a negative electrode based on graphite and a porous positive electrode based on activated carbon, while the electrolyte is a lithiated electrolyte.

One of the main problems to be solved in this type of configuration is the making of a passivation layer in lithium at the surface of a negative electrode.

Different solutions exist for depositing a passivation layer in lithium at the surface of the negative electrode and they have been proposed:

- incorporating into the system an additional lithium sheet, in order to saturate the system with lithium ions, the majority of which is consumed during the first cycles for forming said passivation layer, as described in WO 2010024327, which is however not without the risk of generating significant safety and overcost problems;
- deposition of this layer by evaporation of lithium, this method being however complex and industrially expensive and also generating a weakly oxidized layer, which is detrimental to its use in an electrochemical system.

In addition to the aforementioned drawbacks, hybrid supercapacitors operating on the basis of an assembly including a negative electrode based on graphite and a positive electrode based on activated carbon and a lithiated electrolyte have the other following drawbacks:

- the time constant is degraded because of the resistance of the negative electrode containing a passivation layer and of the low conductivity of lithiated electrolytes, for example as compared with a standard electrolyte 1M TEABF$_4$ in acetonitrile;
- the combined use of graphite and of a lithiated electrolyte generally implies generation of a passivation layer, as discussed above, and therefore a significant consumption of electrolyte at least during the first cycle;
- lithiated electrolytes are expensive (notably LiPF$_6$ or LiTFSI), the costs appearing to be all the higher since the use of activated carbon at the positive electrode requires a relatively large volume of electrolyte in order to be able to saturate the porosity; and
- the working potential of the negative electrode in the aforementioned type of assembling imposes the use of a relatively expensive copper collector and bans the use of a collector in a less expensive material, as this is the case with aluminium.

Considering the foregoing, the inventors set their goal of developing a novel type of hybrid supercapacitors giving the possibility of not resorting to the use of a lithiated electrolyte, which will allow circumvention of the drawbacks notably related to the formation of the passivation layer and also of the costs related to the use of lithium.

DISCUSSION OF THE INVENTION

They thus discovered that by selecting, in a motivated way, specific electrode materials and a specific electrolyte in a device of the supercapacitor type, it is possible to overcome these drawbacks.

This device of hybrid supercapacitor type comprises at least one cell comprising:

- a porous positive electrode comprising activated carbon;
- a negative electrode comprising a carbonaceous material able to insert an alkaline element other than lithium, this carbonaceous material being different from the activated carbon used at the positive electrode; and
- a non-aqueous electrolyte comprising a salt selected from the salts of at least one alkaline metal other than lithium.

The salts of at least one alkaline metal other than lithium, may be sodium salts, potassium salts, rubidium salts, cesium salts and mixtures thereof, and preferably, sodium salts, potassium salts and mixtures thereof.

Before further entering the description, we specify the following definitions.

By positive electrode, is meant the electrode which is the center, within the scope of the invention, of the formation of the electrochemical double layer, which means, in other words that this positive electrode, strictly speaking, forms an electrode which fits well into the operation of the supercapacitor.

By negative electrode, is meant the electrode which is the center, within the scope of the invention, of a redox reaction, which is notably materialized by insertion of the alkaline element, entering the structure of the electrolyte. For example, when this is sodium, the insertion may occur, so that the sodium composition is at least greater than or equal to $NaC_{36}$ and, when this is potassium, the insertion may occur so that the potassium composition is at most equal to $KC_8$, for example ranging from $KC_{64}$ to $KC_8$ and advantageously corresponding to $KC_{16}$.

More specifically, the positive electrode as mentioned above comprises activated carbon, this activated carbon may be present in a content of at least 60% by mass based on the total mass of the electrode, it being understood that the total mass of the electrode does not include the mass of the current collector. Preferably, the activated carbon is present in a content ranging from 60% by mass to 95% by mass based on the total mass of the electrode, still preferably, from 85% to 95% by mass based on the total mass of the electrode.

In addition to the presence of activated carbon, the positive electrode may comprise one or several organic binders, which will contribute to ensuring the mechanical cohesion of said electrode.

These organic binders may in particular be polymeric binders comprising one or several polymers selected from among:

- fluorinated polymers, such as a polytetrafluoroethylene (known under the acronym of PTFE), a poly(vinylidene fluoride) (known under the acronym of PVDF), a poly(vinylidene fluoride-co-hexafluoropropene) copolymer (known under the acronym of PVDF-HFP), a fluorinated ethylene-propylene copolymer (known under the acronym of FEP), a copolymer from the copolymerization of tetrafluoroethylene and of perfluoroalkoxyvinylether (known under the acronym of PFA);
- polyimides;
- polyacrylonitriles; and
- mixtures thereof.

Advantageously, this or these binder(s) is (are) present in a content selected so as to be as small as possible, without compromising the mechanical strength during cycling over the whole range of the temperatures of use, generally comprised between −40° C. and the boiling temperature of the organic solvent(s) optionally entering the structure of the electrolyte. For example, the binder(s) may be present in a content of less than or equal to 15% by mass based on the total mass of the electrode, preferably from 1 to 15% by mass, still preferably from 2 to 7% by mass based on the total mass of the electrode. It is understood that the total mass of the electrode does not include the mass of the current collector.

The positive electrode may also comprise an electrically conductive carbonaceous additive other than activated carbon, selected from carbon blacks, acetylene blacks, graphite, carbon nanotubes, carbon fibers and mixtures thereof, for example, carbon fibers obtained in a vapor phase (known under the acronym of VGCF), said carbonaceous additive may be present in a content ranging up to 15% by mass based on the total mass of the positive electrode, preferably from 1 to 15% by mass, still preferably from 2 to 10% by mass based on the total mass of the positive electrode. It is understood that the total mass of the electrode does not include the mass of the current collector.

When the positive electrode will include, in addition to activated carbon, graphite, the latter will play the role of an electrically conducting additive, it will not be used as a starting point for the formation of the electrochemical double layer (in other words, it may be stated that this graphite is not an activated graphite). Such an electrode may be described as a composite electrode.

The negative electrode, as for it, comprises, as mentioned above, a carbonaceous material for inserting at least one alkaline element other than lithium, such as sodium, potassium, rubidium and/or cesium, an adapted material of this type advantageously being a carbonaceous material of the graphite type, and more specifically a carbonaceous material of the particulate graphite type, for which the average particle size may range from 1 to 10 µm, this particle size being measured by laser grain size measurement $D_{50}$.

In the same way as for the positive electrode, it may comprise one or several organic binders, which will contribute to ensuring the mechanical cohesion of said electrode.

These organic binders may also be polymeric binders comprising one or several polymers selected from among:
  fluorinated polymers, such as polytetrafluoroethylene (known under the acronym of PTFE), a poly(vinylidene fluoride) (known under the acronym of PVDF), a poly(vinylidene fluoride-co-hexafluoropropene) copolymer (known under the acronym of PVDF-HFP), a fluorinated ethylene-propylene copolymer (known under the acronym of FEP), a copolymer from the copolymerization of tetrafluoroethylene and of perfluoroalkoxyvinylether (known under the acronym of PFA);
  polyimides;
  polyacrylonitriles; and
  mixtures thereof.

Advantageously, this or these binder(s) is(are) present in a content selected so as to be as small as possible, without this compromising the mechanical strength during the cycling over the whole of the range of temperatures of use, generally comprised between −40° C. and the boiling temperature of the organic solvent(s).

For example, the binder(s) may be present in a content of less than or equal to 15% by mass based on the total mass of the electrode, preferably from 1 to 15% by mass, still preferably from 2 to 7% by mass based on the total mass of the electrode. It is understood that the total mass of the electrode does not include the mass of the current collector.

The negative electrode may also comprise an electrically conducting carbonaceous additive other than the aforementioned carbonaceous insertion material, selected from carbon blacks, acetylene blacks, graphite, carbon nanotubes, carbon fibers and mixtures thereof, for example carbon fibers obtained in a vapor phase (known under the acronym of VGCF), said carbonaceous additive may be present in a content ranging up to 15% by mass based on the total mass of the negative electrode, preferably from 1 to 15% by mass, still preferably from 2 to 10% by mass based on the total mass of the negative electrode. It is understood that the total mass of the electrode does not include the mass of the current collector.

Further, the negative electrode may also comprise, in addition to the material with insertion capability, when the latter is graphite, activated carbon either identical with or different from that of the positive electrode, which may give the possibility of improving the power performances of the negative electrode. This type of electrode may thus be described as a composite electrode.

Preferably, the electrolyte includes at least one sodium salt and/or one potassium salt.

When the negative electrode is based on a carbonaceous material of the graphite type and the electrolyte comprises at least one sodium salt, the sodium has insertion capability at high loading stages, so that the composition corresponds at most to $NaC_{48}$, which corresponds to a not very great amount of inserted sodium (notably with respect to lithium, which would be inserted for forming an insertion compound of composition $LiC_6$), which has an advantage for accessing a power system, since the saturation phenomenon of the negative electrode will be attained more rapidly than with lithium, which contributes to making this electrode non-limiting from the performance point of view.

The same remarks may be repeated, when the electrolyte comprises at least one potassium salt, potassium, as for it, having the capability of being inserted into the graphite, at high loading stages, so that the composition corresponds at most to $KC_8$, which corresponds to a not very great amount of inserted potassium, however, with the advantages which this has, for the performances of the electrode.

Whether this is the positive electrode or the negative electrode, they may appear, notably when the negative electrode is based on graphite, in the form of a layer with a given thickness, said negative electrode advantageously having a layer of greater thickness than the layer of said positive electrode. This has the advantage of inducing an increase in the energy density, notably from the fact that the graphite entering the structure of the negative electrode is about 100 times more conductive than commercial activated carbons. This thus gives the possibility of finding a remedy to the fact that a supercapacitor conventionally has a lower energy density than that of a lithium-ion battery.

Advantageously, the negative electrode has a surface mass greater than that of the positive electrode.

Indeed, without being bound by theory, this gives the possibility of improving the performances of the devices of the invention, notably in terms of capacities.

The organic electrolyte preferably comprises a salt selected from among sodium salts, potassium salts and mixtures thereof. The use of sodium or potassium which is only inserted at a relatively low stage, has the advantage of avoiding the formation of metal plating, as this may be the case with lithium, which is not without posing problems in terms of safety.

As regards the sodium salts, this may be a salt selected from among $NaClO_4$, $NaBF_4$, $NaPF_6$, sodium bis(trifluoromethanesulfonyl)imide (known under the acronym of NaTFSI), sodium bis(fluorosulfonyl)imide (known under the acronym of NaFSI), sodium bis(oxalato)borate (known under the acronym of NaBOB), NaSCN, $NaSbF_6$, $NaAsF_6$, $NaAlCl_4$, $NaSiF_6$, $NaSO_3CF_3$ and mixtures thereof.

As regards the potassium salts, this may be a salt selected from among $KClO_4$, $KBF_4$, $KPF_6$, potassium bis(trifluoromethanesulfonyl)imide (known under the acronym of KTFSI), potassium bis(fluorosulfonyl)imide (known under the acronym of KFSI), potassium bis(oxalato)borate (known under the acronym of KBOB), KSCN, KSbF$_6$, KAsF$_6$, KAlCl$_4$, KSiF$_6$, KSO$_3$CF$_3$ and mixtures thereof.

The salt(s) entering the structure of the electrolytes of the invention may be used without adding any solvent(s), in which case the resulting electrolyte is described as an ionic liquid or in solution in at least one organic solvent, for example at a concentration at least equal to 0.05 mol/L and which may reach saturation of said organic solvent(s) at 25° C.

Said organic solvent(s) may be selected from among:
- nitrile solvents, such as acetonitrile, 3-methoxypropionitrile (known under the acronym of MPN), adiponitrile (known under the acronym of ADP), glutaronitrile (known under the acronym of GN);
- carbonate solvents, such as ethylene carbonate (known under the acronym of EC), propylene carbonate (known under the acronym of PC), dimethyl carbonate (known under the acronym of DMC), diethyl carbonate (known under the acronym of DEC), ethylmethyl carbonate (known under the acronym of EMC);
- lactone solvents, such as γ-butyrolactone (known under the acronym of GBL), γ-valerolactone (known under the acronym of GVL);
- sulfone solvents, such as dimethylsulfone (known under the acronym of DMS), ethylmethylsulfone (known under the acronym of EMS), diethylsulfone (known under the acronym of DES), sulfolane (known under the acronym of SL);
- lactam solvents, such as N-methylpyrrolidone (known under the acronym of NMP);
- amide solvents, such as N,N-dimethylformamide (known under the acronym of DMF), dimethylacetamide (known under the acronym of DMA), formamide (known under the acronym of FA), N-methylformamide (known under the acronym of NMF);
- ketone solvents, such as acetone, methylethylketone (known under the acronym of MEK);
- nitroalkane solvents, such as nitromethane (known under the acronym of NM), nitroethane (known under the acronym of NE);
- amine solvents, such as 1,3-diaminopropane (known under the acronym of DAP), ethylenediamine (known under the acronym of EDA);
- sulfoxide solvents, such as dimethylsulfoxide (known under the acronym of DMSO);
- ester solvents, such as ethyl acetate (known under the acronym of EA), methyl acetate (known under the acronym of MA), propyl acetate (known under the acronym of AP);
- linear ether solvents, such as dimethoxyethane (known under the acronym of DME);
- cyclic ether solvents, such as dioxane, dioxolane (known under the acronym of DIOX), tetrahydrofurane (known under the acronym of THF);
- oxazolidone solvents, such as 3-methyl-2-oxazolidone; and
- mixtures thereof.

When the electrolyte comprises at least one sodium salt, it advantageously comprises a salt selected from among NaClO$_4$, NaPF$_6$, NaBF$_4$ and mixtures thereof, in solution in at least one solvent selected from among carbonate solvents, linear ether solvents, nitrile solvents, lactone solvents, amide solvents and mixtures thereof.

More specifically, a suitable electrolyte is an electrolyte comprising at least one sodium salt selected from among NaClO$_4$, NaPF$_6$, NaBF$_4$ and mixtures thereof, in solution in at least one solvent selected from among propylene carbonate, ethylene carbonate, diethyl carbonate, dimethyl carbonate, dimethoxyethane, acetonitrile, γ-butyrolactone, dimethylformamide and mixtures thereof.

Still more specifically, electrolytes comprising at least one suitable sodium salt are electrolytes comprising as a sodium salt, NaClO$_4$, NaPF$_6$ or NaBF$_4$ (for example, 1M) in solution in a solvent or mixture of solvents, such as:
- propylene carbonate alone;
- ethylene carbonate/diethyl carbonate (1:1) mixture;
- ethylene carbonate/dimethyl carbonate (1:1) mixture;
- dimethoxyethane/propylene carbonate (1:2) mixture;
- acetonitrile alone;
- γ-butyrolactone alone; or
- dimethylformamide alone.

These specific electrolytes have the advantage of reconciling high conductivity while being not very expensive, because of the ingredients which make them up, being aware that for information, NaClO$_4$ is 10 times less expensive than a lithium salt conventionally used in lithium-ion batteries, such as LiPF$_6$.

More specifically, when the negative electrode is a composite electrode as mentioned above, an adapted specific electrolyte may be an electrolyte comprising a mixture of salts, such as the following mixtures:
- TEAPF$_6$ (tetraethylammonium hexafluorophosphate)+NaPF$_6$ (for example, 1M) in acetonitrile; or
- TEABF$_4$ (tetraethylammonium tetrafluoroborate)+NaPF$_6$ (for example, 1M) in acetonitrile.

When the electrolyte comprises at least one potassium salt, it advantageously comprises a salt selected from among KClO$_4$, KPF$_6$, KBF$_4$ and mixtures thereof, in solution in at least one solvent selected from among carbonate solvents, linear ether solvents, nitrile solvents, lactone solvents, amide solvents and mixtures thereof.

More specifically, a suitable electrolyte is an electrolyte comprising at least one potassium salt selected from KClO$_4$, KPF$_6$, KBF$_4$ and mixtures thereof, in solution in at least one solvent selected from among propylene carbonate, ethylene carbonate, diethyl carbonate, dimethyl carbonate, dimethoxyethane, acetonitrile, γ-butyrolactone, dimethylformamide and mixtures thereof.

Still more specifically, suitable electrolytes comprising at least one potassium salt are the electrolytes comprising as a potassium salt, KClO$_4$, KPF$_6$ or KBF$_4$ (for example, 1M) in solution in a solvent or mixture of solvents, such as:
- propylene carbonate alone;
- ethylene carbonate/diethyl carbonate (1:1) mixture;
- ethylene carbonate/dimethyl carbonate (1:1) mixture;
- dimethoxyethane/propylene carbonate (1:2) mixture;
- acetonitrile alone;
- γ-butyrolactone alone; or
- dimethylformamide alone.

These specific electrolytes have the advantage of reconciling high conductivity while being not very expensive, because of the ingredients making them up, being aware that, for information, KClO$_4$ is 20 times less expensive than a lithium salt conventionally used in lithium-ion batteries, such as LiPF$_6$.

More specifically, when the negative electrode is a composite electrode as mentioned above, a suitable specific electrolyte adapted may be an electrolyte comprising a mixture of salts, such as the following mixtures:
- TEAPF$_6$ (tetraethylammonium hexafluorophosphate)+KPF$_6$ (for example, 1M) in acetonitrile;
- TEABF$_4$ (tetraethylammonium tetrafluoroborate)+KPF$_6$ (for example, 1M) in acetonitrile.

The positive electrode and the negative electrode may each be associated with an electrically conducting current collector, this current collector may appear as a metal sheet affixed onto one of the faces of said electrodes.

In particular, because the potential of the $Na^+/Na$ pair and the potential of the couple $K^+/K$ pair (respectively +0.22 V vs. $Li/Li^+$ and +0.12 V vs. $Li/Li^+$) are high, it is possible to use a collector in a metal material selected from among copper, aluminium, nickel or stainless steel, with preferably a collector in aluminium, notably for reasons of costs. Furthermore, the use of sodium or potassium in the electrolyte gives the possibility, combined with an aluminium collector, of using acetonitrile in the electrolyte, which has the following advantages:

- a very strong increase in the conductivity of the electrolyte as compared with lithiated electrolytes;
- the possibility of advantageously increasing the thicknesses of the electrodes, and therefore increasing the energy density.

When the organic solvent used in the electrolyte is acetonitrile, the device of the invention may further comprise a gas discharging system, such as a vent.

Indeed, during high cycling periods, gas may be formed such as hydrogen, from the breaking down of acetonitrile, the formation of this gas may cause local deformations at the device, which may induce a separation of the electrodes and concomitantly an increase in the internal resistance.

Further, when the organic solvent used in the electrolyte is acetonitrile, the electrolyte may comprise at least one additive so as to reduce the flammability of the solvent.

The current collector may also be a smooth collector or a collector etched at least on one of its faces.

Preferably, when the current collector is in copper, the electrolyte does not comprise acetonitrile but may comprise at least one carbonate solvent, such as a mixture of carbonate solvents.

Other features will become better apparent upon reading the additional description which follows, which relates to examples of supercapacitors compliant with the invention.

Of course, the examples which follow are only given as an illustration of the object of the invention and are by no means a limitation of this object.

SHORT DESCRIPTION OF THE DRAWINGS

Figure 12:
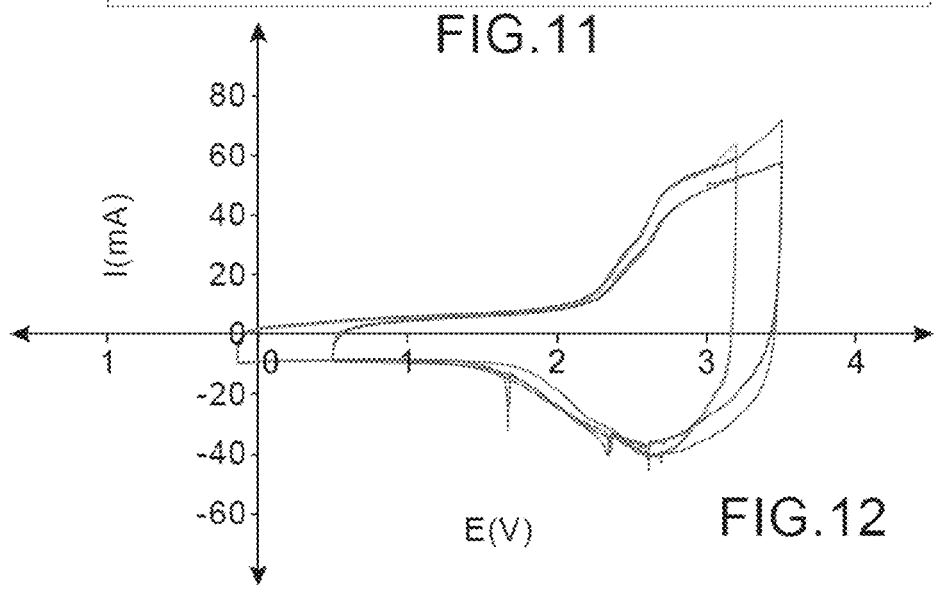

FIG. 12 is a graph illustrating a voltammogram obtained by cycling between 1.5 and 3.2 V (3 cycles) and by cycling between 1.5 and 3.7 V (3 cycles) with the second cell of Example 4 (part b).

Figure 13:
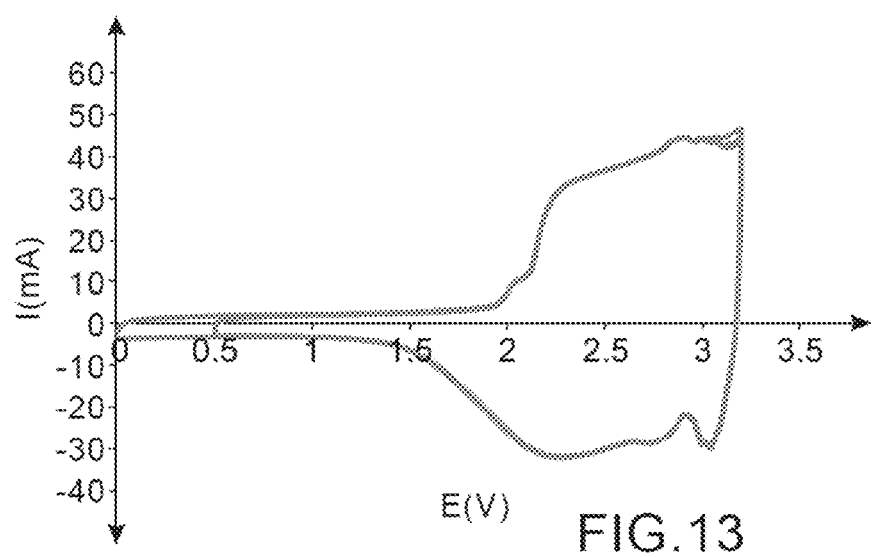

FIG. 13 is a graph illustrating a voltammogram obtained within the scope of the test conducted in Example 5 (part a).

DETAILED DISCUSSION OF PARTICULAR EMBODIMENTS

COMPARATIVE EXAMPLE 1

This example illustrates the preparation of various supercapacitors non-compliant with the invention, the preparation methods of which appear below.

a) Producing a First Supercapacitor Non-Compliant with the Invention

The first supercapacitor non-compliant with the invention is prepared with an identical positive electrode and negative electrode, i.e. of the same nature and of the same basis weight, said electrodes being prepared by coating on an etched aluminium collector of a thickness of 30 μm with a composition comprising:

- 84% of activated carbon of reference YP50F (obtained from Kuraray Chemicals Co., Japan);
- 4% of a styrene-butadiene rubber (obtained from BASF, LD417);
- 8% of carbon black of reference superC65 (obtained from Timcal Co., Switzerland);
- 4% of carboxymethylcellulose with a mass average molecular mass of 300,000 (obtained from Aldrich);

the % being expressed mass percentages based on the total mass of the electrode excluding the current collector, said electrodes have a thickness of 158 μm (collector included) and an active material mass of 21.4 mg.

The aforementioned electrodes with a diameter of 14 mm are assembled in a button cell. The electrolyte used is $NaPF_6$ (1M) in acetonitrile and is used with a sufficient amount in order to impregnate the whole of the button cell. The separator used is PDA25® (which corresponds to polypropylene) (obtained from Treofan GmbH, Germany) with a thickness of 25 μm.

The system is tested via galvanostatic cycling. The volume and gravimetric capacities are measured, after 10 cycles between 0 V and 2.5 V under conditions of 0.3 A/g (gram of electrodes), between 2.43 V and 1.35 V for applying a linear regression on the discharge curve.

b) Producing a Second Supercapacitor Non-Compliant with the Invention

In this embodiment, the electrolyte of mode a) is replaced with 1M $NaClO_4$ in acetonitrile. The electrodes have a thickness of 135 μm (collector included) corresponding to 15 mg of active material per electrode.

c) Producing a Third Supercapacitor Non-Compliant with the Invention

In this embodiment, the electrolyte of mode a) is replaced with LiPF$_6$ 1M in an EC/PC/DMC (1/1/1) mixture. The electrodes have a thickness of 160 µm (collector included) corresponding to 21.1 mg of active material per electrode.

d) Results

The table below shows the results obtained with the embodiments a) to c) in terms of mass capacities and of mass densities of the electrodes.

| Modes | Mass capacity (in F/g) | Mass energy density (Wh/kg) |
|---|---|---|
| a | 32 | 27.1 |
| b | 34.4 | 25.2 |
| c | 31.1 | 26.1 |

These results show that replacing a lithiated salt with a salt containing sodium does not have any effect on the mass capacity and the mass energy density of tested supercapacitors, which may suggest that the use of a salt containing sodium is equivalent to that of a lithiated salt in terms of results.

EXAMPLE 1

This example illustrates the preparation of various power supercapacitors with high energy density in accordance with the invention and, as a comparison, of supercapacitors non-compliant with the invention.

a) Producing a First Supercapacitor in Accordance with the Invention

In a first phase, it is proceeded with the preparation of a positive electrode and of a negative electrode.

The positive electrode is prepared by coating on an etched aluminium collector with a thickness of 30 µm a composition comprising:
- 84% of activated carbon of reference YP50F (obtained from Kuraray Chemicals Co., Japan);
- 4% of a styrene-butadiene rubber (obtained from BASF, LD417);
- 8% of carbon black with reference superC65 (obtained from Timcal Co., Switzerland);
- 4% of carboxymethylcellulose with a mass average molecular mass of 300,000 (obtained from Aldrich);

the % being mass percentages expressed based on the total mass of the electrode excluding the current collector, this electrode has a thickness of 156 µm (collector included) and has an active material mass of 15.8 mg.

The negative electrode is prepared by coating on an etched aluminium collector with a thickness of 30 µm a composition comprising:
- 91.7% of graphite with reference KS6 (obtained from Timcal Co., Switzerland);
- 3.15% of a styrene-butadiene rubber (obtained from BASF, LD417);
- 3.15% of carbon black with reference superC65 (obtained from Timcal Co., Switzerland);
- 2% of carboxymethylcellulose with a mass molecular mass ($M_w$) of 300,000 (obtained from Aldrich);

the % being mass percentages expressed based on the total mass of the electrode excluding the current collector, this electrode having a thickness of 59 µm (collector excluded) and having an active material mass of 19 mg.

The aforementioned electrodes with a diameter of 14 mm are assembled in a button cell. The electrolyte used is NaPF$_6$ (1M) in acetonitrile and is used in a sufficient amount in order to impregnate the whole of the button cell. The separator used is PDA25® (which corresponds to polypropylene) (obtained from Treofan GmbH, Germany) with a thickness of 25 µm.

The system is tested via galvanostatic cycling. The energy density is measured after 10 cycles between 0 V and 2.5 V under conditions of 0.1 A/g (gram of electrodes).

b) Producing a Second Supercapacitor in Accordance with the Invention

This second supercapacitor is produced according to a procedure similar to the one discussed in paragraph a) above, except that the electrolyte is replaced with NaClO$_4$ 1M in acetonitrile.

c) Producing a Third Supercapacitor in Accordance with the Invention

This third supercapacitor is produced according to a procedure similar to the one discussed in paragraph a) above, except that the electrolyte is replaced with NaClO$_4$ 1M in an ethylene carbonate/dimethyl carbonate mixture.

d) Producing a Fourth Supercapacitor Non-Compliant with the Invention

This fourth supercapacitor is produced according to a procedure similar to the one discussed in paragraph a) above, except that the activated carbon is placed at the negative electrode and the graphite at the positive electrode.

e) Producing a Fifth Supercapacitor Non-Compliant with the Invention

This fifth supercapacitor is produced according to a procedure similar to the one discussed in paragraph a) except that the electrolyte is replaced with LiPF$_6$ 1M in acetonitrile.

f) Results

The cyclings are carried out between 0 and 2.5 V and for each of the supercapacitors made, it was proceeded with measurement of the mass energy E (expressed in Wh/kg), of the mass power P (expressed in W/kg) at 72 s.

The obtained results appear in the table below.

| | E (in Wh/kg) | P (in W/kg) at 72 s |
|---|---|---|
| First supercapacitor | 6.4 | 180 |
| Second supercapacitor | 4.6 | 120 |
| Third supercapacitor | 1.03 | 70 |
| Fourth supercapacitor | 0 | 0 |
| Fifth supercapacitor | Not measurable because of corrosion | Not measurable because of corrosion |

It is seen that for the supercapacitors in accordance with the invention, high values are obtained both in terms of mass energy and of mass power.

As regards the fourth supercapacitor non-compliant with the invention, no capacity was able to be measured, which is explained by the fact that the sodium can only be inserted at the negative electrode and that the activated carbon present at this negative electrode is not suitable for allowing insertion of sodium.

As regards the fifth supercapacitor non-compliant with the invention, the formation of a lithium-aluminium alloy with acetonitrile is observed, causing total degradation of the negative electrode. This therefore excludes the combined use of lithium, aluminium and acetonitrile.

g) Comparison of Voltage Profiles Between a Supercapacitor of the Invention and a Supercapacitor Non-Compliant with the Invention.

Figure 3:
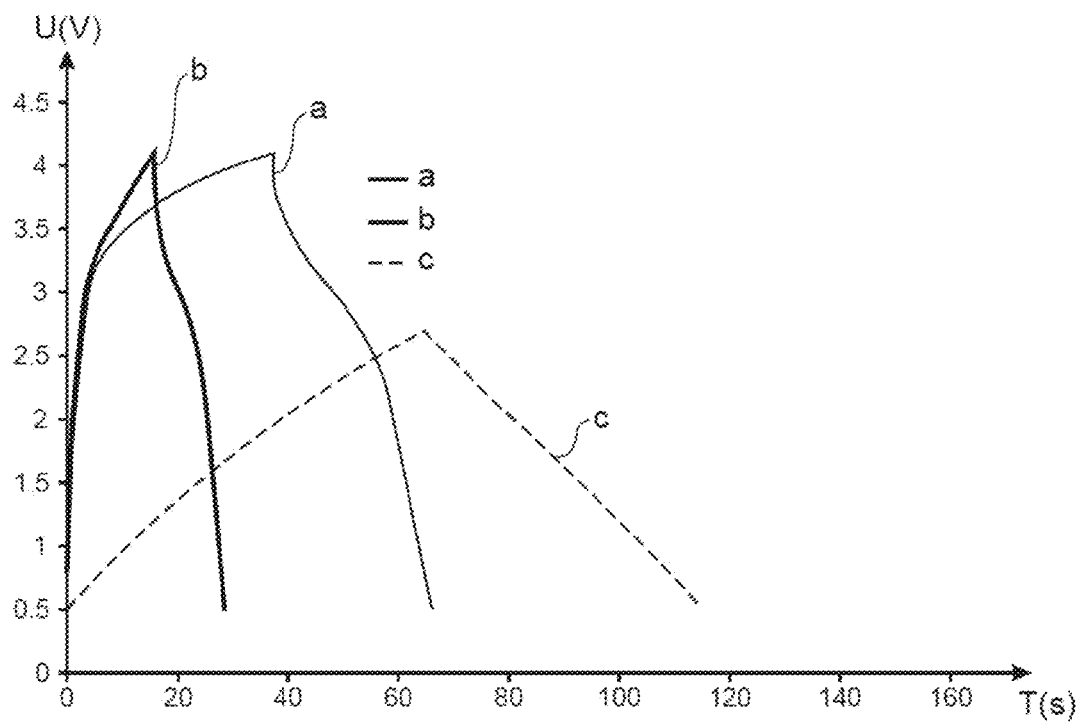
FIG. 3 is a graph illustrating the time-dependent change in the voltage U (in V) depending on the duration T (in s) for a supercapacitor in accordance with the invention and a supercapacitor non-compliant with the invention subject to charging/discharging conditions according to what is discussed in paragraph g) of Example 1.

A supercapacitor in accordance with the first aforementioned supercapacitor is subject to several charging/discharging conditions (respectively, to 0.6 A/g of active material and 1.25 A/g of active material), the time-dependent change in the voltage U (in V) depending on the duration T (in s) being illustrated by curves a) and b) of FIG. 3 enclosed as an annex.

Figure 2:
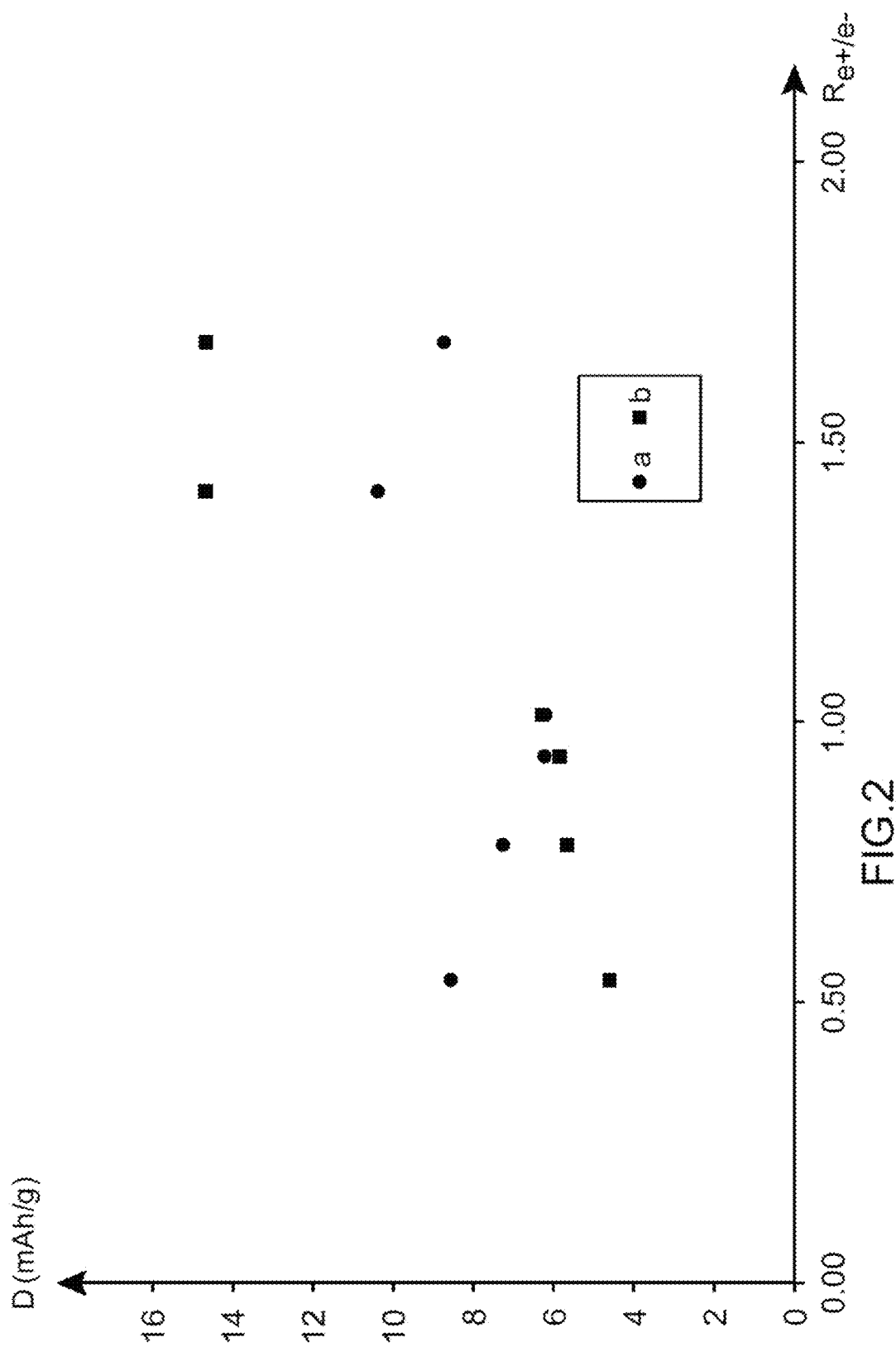
FIG. 2 is a graph illustrating the time-dependent change in the capacity mass density D (expressed in mAh/g) depending on the ratio $R_{e+/e-}$ for various supercapacitors discussed in paragraph g) of Example 2.

A supercapacitor non-compliant with the invention corresponds to the supercapacitor of mode a) of comparative example 1 except that the electrolyte is replaced with $TEABF_4$ 1M in acetonitrile, this supercapacitor being subject to charging/discharging conditions at 0.6 A/g, the time-dependent change in the voltage U (in V) depending on the duration T (in s) being illustrated by curve c) of FIG. 2 enclosed as an annex.

For identical charging conditions, it was seen that the mass energy is 20% higher than in the case of the supercapacitor in accordance with the invention.

h) Proposal for Maximizing the Energy Density of the Supercapacitors of the Invention One way of maximizing the energy density emitted by a supercapacitor is to balance the energy density of both of these electrodes. To do this, it is necessary to determine the capacity of the constitutive electrode materials of the supercapacitors of the invention.

A plan of experiments was elaborated in order to test the effects of the various thickness ratios for the positive electrode and the negative electrode of the supercapacitors according to the invention and for notably finding the optimum ratio for obtaining maximum energy density. This plan was carried out with supercapacitors similar to the one described in a), i.e. notably with an electrolyte $NaPF_6$ 1M in acetonitrile, except that the thickness ratios between the positive and negative electrodes were respectively varied, as well as the active material contents and the active material masses used (the active materials respectively being the activated carbon, designated below as "active material+", for the positive electrodes and graphite, designated below as "active material –", for the negative electrodes).

The table below groups the characteristics of the tested supercapacitors, the characteristics being the following:
- the ratio of the masses of active materials of the positive electrode over those of the negative electrode, entitled as R $e^+/e^-$;
- the mass percentage of the active material+, entitled % mat+;
- the mass percentage of the active material–, entitled % mat–;
- the total mass of the positive electrode, entitled as mtot+, expressed in mg;
- the total mass of the negative electrode, entitled as mtot–, expressed in mg;
- the total mass used of positive active material, entitled as mact+, is expressed in mg;
- the total mass used of negative active material, entitled as mact–, is expressed in mg;
- the thickness of the positive electrode, entitled as e+, is expressed in μm;
- the thickness of the negative electrode, entitled as e–, is expressed in μm.

| R $e^+/e^-$ | % mat+ | % mat– | mtot+ | mtot– | mact+ | mact– | e+ | e– |
|---|---|---|---|---|---|---|---|---|
| 0.39 | 81 | 92.8 | 15.8 | 31.1 | 10.0 | 25.6 | 76 | 80 |
| 0.41 | 81 | 91.8 | 18.8 | 36.1 | 12.4 | 30.0 | 106 | 121 |
| 0.61 | 81 | 91.7 | 15.8 | 21.3 | 10.0 | 16.3 | 76 | 49 |
| 0.625 | 81 | 91.7 | 15.9 | 21.0 | 10.0 | 16.0 | 78 | 45 |

-continued

| R $e^+/e^-$ | % mat+ | % mat– | mtot+ | mtot– | mact+ | mact– | e+ | e– |
|---|---|---|---|---|---|---|---|---|
| 0.79 | 81 | 91.7 | 18.9 | 20.7 | 12.5 | 15.8 | 106 | 44 |
| 0.83 | 84 | 91.7 | 22.3 | 24.3 | 15.8 | 19.0 | 156 | 69 |
| 1.41 | 81 | 91.7 | 36.9 | 24.3 | 27.1 | 19.1 | 305 | 68 |
| 1.51 | 81 | 91.7 | 32.9 | 21.1 | 23.0 | 15.2 | 269 | 48 |

In a similar way like for the supercapacitor elaborated in a), the supercapacitors, for which the characteristics are shown in the table above, are elaborated in a glove box and tested in cycling. The first formation step consists of achieving galvanostatic cycling with a low current (here, 100 μA, i.e. 3 to 6 mA/g, which corresponds to a charging/discharging process at C/2 approximately for the negative electrode).

The capacities of the cells were measured ($Q_{cell}$) and, with the obtained values, the capacity mass densities of the positive electrode and of the negative electrode ($Q^+$ and $Q^-$ respectively), expressed in mAh/g were determined by means of the following formulae:

$$Q^+ = (Q_{cell}/mtot^+) \quad Q^- = (Q_{cell}/mtot^-)$$

Figure 1:
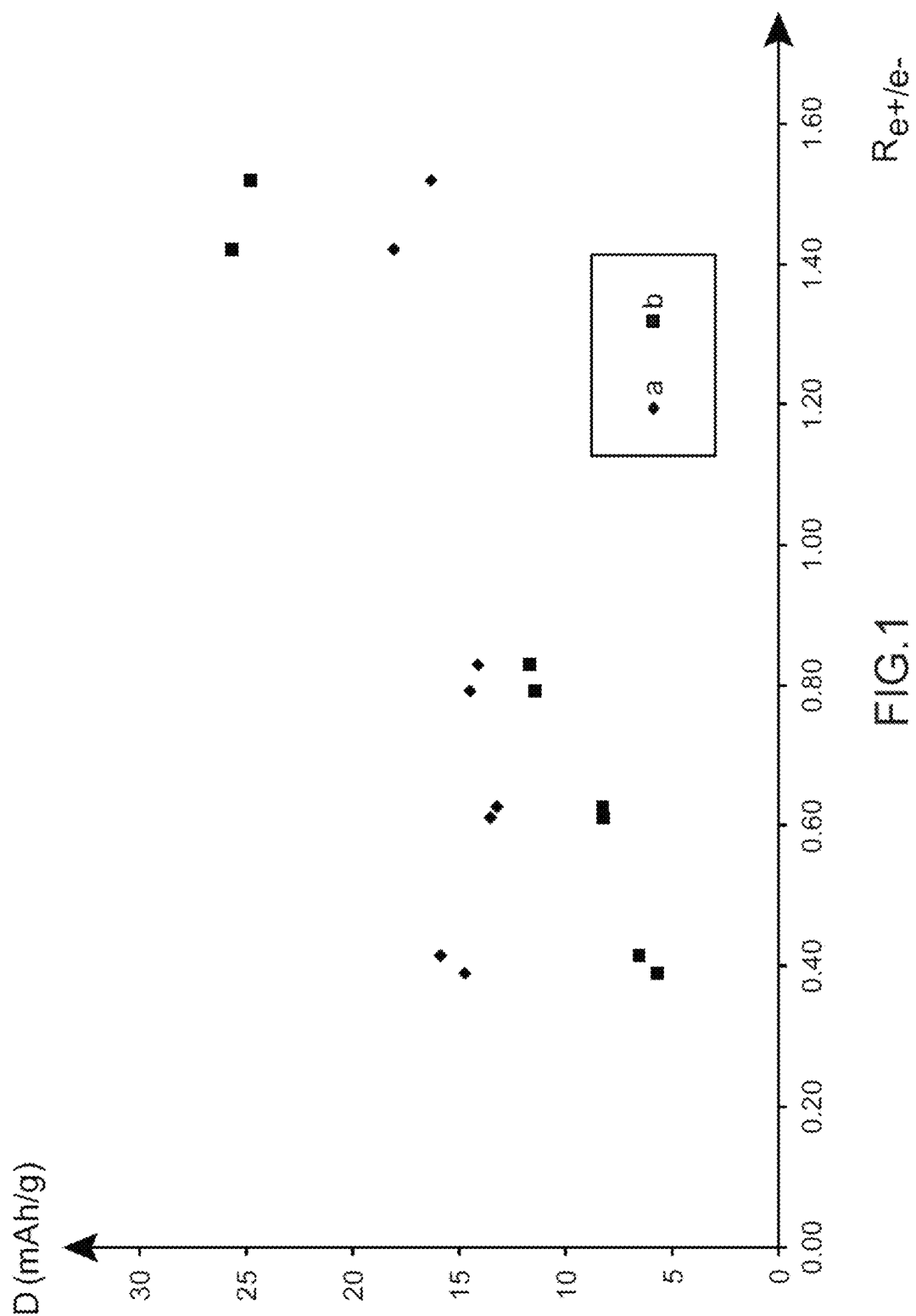
FIG. 1 is a graph illustrating the time-dependent change in the capacity mass density D (expressed in mAh/g) depending on the ratio $R_{e+/e-}$ for various supercapacitors discussed in paragraph g) of Example 1.

As this emerges from the graph of FIG. 1 (respectively curve a) for $Q^+$ and curve b) for $Q^-$ for a test at 2 mA), the $Re^+/e^-$ ratio has little influence on $Q^+$. As for $Q^-$, the curve breaks down into a linear range, wherein $Q^-$ increases linearly versus $Re^+/e^-$.

This is compliant with the theory: the negative electrode is much more capacitive than the positive electrode. By not completely inserting the negative electrode, it is possible to access a high power level. For an $Re^+/e^-$ ratio=1, the capacities of both electrodes are identical.

COMPARATIVE EXAMPLE 2

This example illustrates the preparation of different supercapacitors non-compliant with the invention, the preparation methods of which appear below.

a) Producing a First Supercapacitor Non-Compliant with the Invention

The first supercapacitor non-compliant with the invention is prepared with identical positive electrode and negative electrode, i.e. of the same nature and of the same basis weight, said electrodes being prepared by coating on an etched aluminium collector with a thickness of 30 μm a composition comprising:
- 84% of activated carbon of reference YP50F (obtained from Kuraray Chemicals Co., Japan);
- 4% of a styrene-butadiene rubber (obtained from BASF, LD417);
- 8% of carbon black of reference superC65 (obtained from Timcal Co., Switzerland);
- 4% of carboxymethylcellulose with a mass average molecular mass of 300,000 (obtained from Aldrich);

the % being mass percentages expressed based on the total mass of the electrode excluding the current collector, said electrodes having a thickness of 106 μm (collector included) and an active material mass of 15.9 mg.

The aforementioned electrodes with a diameter of 14 mm are assembled in a button cell. The electrolyte used is $KPF_6$ (1M) in acetonitrile and is used in a sufficient amount for impregnating the whole of the button cell. The separator used is PDA25® (which corresponds to polypropylene) (obtained from Treofan GmbH, Germany) with a thickness of 25 μm.

The system is tested via galvanostatic cycling. The volume and gravimetric capacities are measured, after 10 cycles between 0 V and 2.5 V under conditions of 0.3 A/g (gram of electrodes), between 2.43 V and 1.35 V by applying a linear regression on the discharge curve.

b) Producing a Second Supercapacitor Non-Compliant with the Invention

In this embodiment, the electrolyte of mode a) is replaced with $KClO_4$ 1M in acetonitrile. The electrodes have a thickness of 150 µm (collector included) corresponding to 21 mg of active material per electrode.

c) Producing a Third Supercapacitor Non-Compliant with the Invention

In this embodiment, the electrolyte of mode a) is replaced with $LiPF_6$ 1M in an EC/PC/DMC (1/1/1) mixture. The electrodes have a thickness of 160 µm (collector included) corresponding to 21.1 mg of active material per electrode.

d) Results

The table below shows the results obtained with the embodiments a) to c) in terms of mass capacities and of mass densities of the electrodes.

| Modes | Mass capacity (in F/g) | Mass energy density (Wh/kg) |
|---|---|---|
| a | 26.6 | 20.3 |
| b | 35.3 | 28.4 |
| c | 31.1 | 26.1 |

These results show that replacing a lithiated salt with a salt containing potassium has no effect on the mass capacity and the mass energy density of the tested supercapacitors, which may suggest that the use of a salt containing sodium is equivalent to that of a lithiated salt in terms of results.

EXAMPLE 2

This example illustrates the preparation of various power supercapacitors with high energy density in accordance with the invention and, as a comparison, of supercapacitors non-compliant with the invention.

a) Producing a First Supercapacitor in Accordance with the Invention

In a first phase, it is proceeded with the preparation of a positive electrode and of a negative electrode.

The positive electrode is prepared by coating on an etched aluminium collector with a thickness of 30 µm a composition comprising:

84% of activated carbon of reference YP50F (obtained from Kuraray Chemicals Co., Japan);
4% of a styrene-butadiene rubber (obtained from BASF, LD417);
8% of carbon black of reference superC65 (obtained from Timcal Co., Switzerland);
4% of carboxymethylcellulose with a mass average molecular mass of 300,000 (obtained from Aldrich);
the % being mass percentages expressed on the basis of the total mass of the electrode excluding the current collector, this electrode having a thickness of 168 µm (collector included) and having an active material mass of 17.8 mg.

The negative electrode is prepared by coating on an etched aluminium collector with a thickness of 30 µm a composition comprising:

91.7% of graphite of reference KS6 (obtained from Timcal Co., Switzerland);
3.15% of a styrene-butadiene rubber (obtained from BASF, LD417);
3.15% of carbon black of reference superC65 (obtained from Timcal Co., Switzerland);
2% of carboxymethylcellulose of a mass average molecular mass ($M_w$) of 300,000 (obtained from Aldrich);
the % being mass percentages expressed on the basis of total mass of the electrode excluding the current collector, this electrode having a thickness of 66 µm (collector excluded) and having an active mass of 18.9 mg.

The aforementioned electrodes with a diameter of 14 mm are assembled in a button cell. The electrolyte used is $KPF_6$ (1M) in acetonitrile and is used in a sufficient amount for impregnating the whole of the button cell. The separator used is PDA25® (which is polypropylene) (obtained from Treofan GmbH, Germany) with a thickness of 25 µm.

The system is tested via galvanostatic cycling. The energy density is measured after 10 cycles between 0 V and 2.5 V under conditions of 0.1 A/g (gram of electrodes).

b) Producing a Second Supercapacitor in Accordance with the Invention

This second supercapacitor is produced according to a procedure similar to the one discussed in paragraph a) above, except that the electrolyte is replaced with $KPF_6$ 1M in an ethylene carbonate/dimethyl carbonate mixture.

c) Producing a Third Supercapacitor in Accordance with the Invention

This third supercapacitor is produced according to a procedure similar to the one discussed in paragraph a) above, except that the electrolyte is replaced with $KClO_4$ 1M in an ethylene carbonate/dimethyl carbonate mixture.

d) Producing a Fourth Supercapacitor Non-Compliant with the Invention

This fourth supercapacitor is produced according to a procedure similar to the one discussed in paragraph a) above, except that the activated carbon is placed at the negative electrode and the graphite at the positive electrode.

e) Producing a Fifth Supercapacitor Non-Compliant with the Invention

This fifth supercapacitor is produced according to a procedure similar to the one discussed in paragraph a) above, except that the electrolyte is replaced with $LiPF_6$ 1M in acetonitrile.

f) Results

The cyclings were carried out between 0 and 2.5 V and for each of the produced supercapacitors, it was proceeded with the measurement of the mass energy E (expressed in Wh/kg) and of the mass power P (expressed in W/kg) at 72 s.

The obtained results appear in the table below.

| | E (in Wh/kg) | P (in W/kg) at 72 s |
|---|---|---|
| First supercapacitor | 5.0 | 250 |
| Second supercapacitor | 1.2 | 60 |
| Third supercapacitor | 1.4 | 65 |
| Fourth supercapacitor | 0 | 0 |
| Fifth supercapacitor | Not measurable because of corrosion | Not measurable because of corrosion |

It is seen that, for the supercapacitors in accordance with the invention, higher values are obtained in terms of mass energy and of mass power.

As regards the fourth supercapacitor non-compliant with the invention, no capacity was able to be measured, which is explained by the fact that sodium can only be inserted at the negative electrode and that the activated carbon present at this negative electrode is not suitable for allowing insertion of sodium.

As regards the fifth supercapacitor non-compliant with the invention, the formation of a lithium-aluminium alloy is observed.

This therefore excludes the combined use of lithium, aluminium and acetonitrile.

g) Comparison of Voltage Profiles Between a Supercapacitor of the Invention and a Supercapacitor Non-Compliant with the Invention A supercapacitor compliant with the first aforementioned supercapacitor is subject to several charging/discharging conditions (respectively, at 0.6 A/g of active material, 1.25 A/g of active material, 1.85 A/g of active material and 3.7 A/g of active material), the time-dependent change in the voltage U (in V) depending on the duration T (in s) being illustrated by curves a) to d) of FIG. 3 enclosed as an annex.

Figure 4:
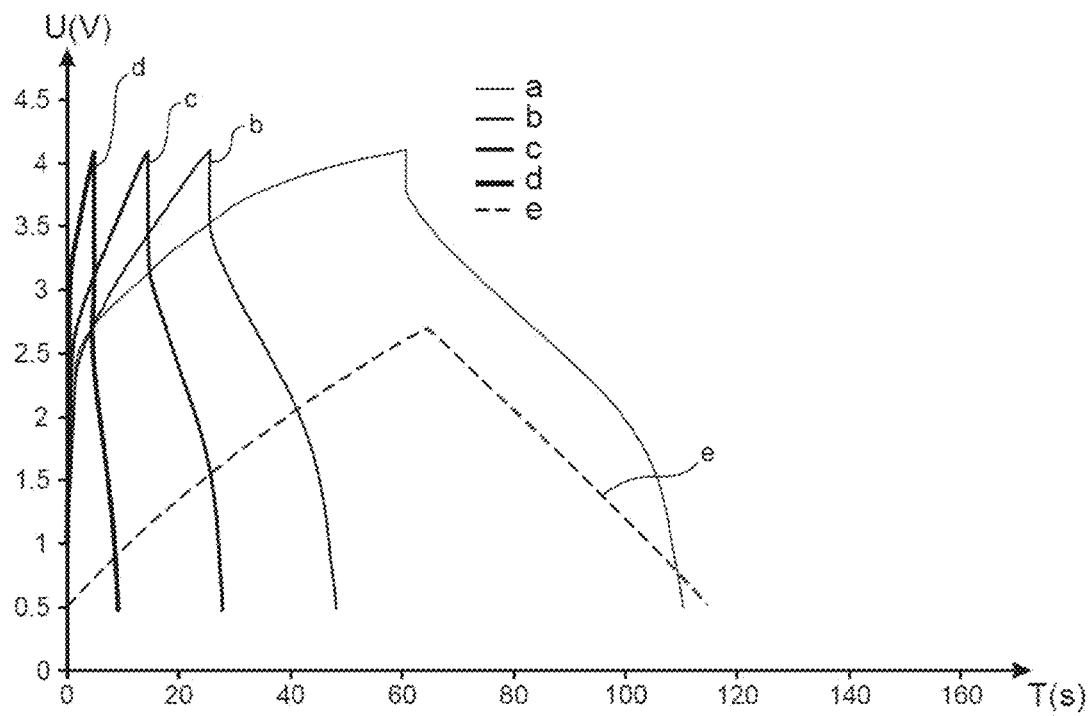
FIG. 4 is a graph illustrating the time-dependent change in the voltage U (in V) depending on the duration T (in s) for a supercapacitor in accordance with the invention and a supercapacitor non-compliant with the invention subject to charging/discharging conditions according to what is discussed in paragraph g) of Example 2.

A supercapacitor non-compliant with the invention corresponds to the supercapacitor of mode a) of Comparative Example 1 except that the electrolyte is replaced with TEABF$_4$ 1M in acetonitrile, this supercapacitor being subject to charging/discharging conditions at 0.6 A/g, the time-dependent change in the voltage U (in V) depending on the duration T (in s) being illustrated by curve e) of FIG. 4 enclosed as an annex.

For identical charging conditions, it was seen that the mass energy is 1.9 times higher in the case of the supercapacitor in accordance with the invention.

h) Proposal for Maximizing the Energy Density of the Supercapacitors of the Invention One way of maximizing the energy density emitted by a supercapacitor is to balance the energy density of both of these electrodes. To do this, it is necessary to determine the capacity of the constitutive electrode materials of the supercapacitors of the invention.

A plan of experiments was elaborated in order to test the effects of the different thickness ratios for the positive electrode and the negative electrode of the supercapacitors according to the invention and notably finding the optimum ratio for obtaining maximum energy density. This plan was carried out with supercapacitors like the one described in a), i.e. notably with an electrolyte KPF$_6$ 1M in acetonitrile, except that the thickness ratios between the electrodes, the active material contents and the active material masses used (the active materials respectively being the activated carbon, designated below as "active material+", for the positive electrodes and graphite, designated below as "active material−", for the negative electrodes) were varied respectively.

The table below groups the characteristics of the tested supercapacitors, the characteristics being the following:
- the ratio of the masses of active materials of the positive electrode over those of the negative electrode, entitled as R e$^+$/e$^-$;
- the mass percentage of the active material+, entitled as % mat+;
- the mass percentage of the active material−, entitled as % mat−;
- the total mass of the positive electrode, entitled as mtot+, expressed in mg;
- the total mass of the negative electrode, entitled as mtot−, expressed in mg;
- the total mass used of positive active material, entitled as mact+, expressed in mg;
- the total mass used of negative active material, entitled as mact−, expressed in mg;
- the thickness of the positive electrode, entitled as e+, expressed in μm;
- the thickness of the negative electrode, entitled as e−, expressed in μm.

| R e$^+$/e$^-$ | % mat+ | % mat− | mtot+ | mtot− | mact+ | mact− | e+ | e− |
|---|---|---|---|---|---|---|---|---|
| 0.54 | 81 | 90.8 | 18.6 | 28.5 | 12.2 | 22.7 | 108 | 84 |
| 0.78 | 81 | 91.7 | 23.5 | 27.5 | 17.2 | 22.0 | 157 | 70 |
| 0.94 | 86 | 91.7 | 24.2 | 24.1 | 17.8 | 18.9 | 168 | 66 |
| 1.02 | 81 | 91.7 | 27.3 | 24.3 | 19.3 | 19.0 | 125 | 68 |
| 1.41 | 81 | 91.7 | 31.2 | 20.8 | 22.4 | 15.9 | 250 | 47 |
| 1.68 | 81 | 91.7 | 36.9 | 21.1 | 27.1 | 16.1 | 305 | 46 |

In the same way as for the supercapacitor elaborated in a), the supercapacitors, for which the characteristics are stated in the table above, are elaborated in a glove box and tested in cycling. The first formation step consists of producing galvanostatic cycling with a low current (here, 100 μA, i.e. 3 to 6 mA/g, which corresponds to a charging/discharging process at about C/2 for the negative electrode).

The capacities of the cells were measured ($Q_{cell}$) and, with the obtained values, the capacity mass densities of the positive electrode and of the negative electrode ($Q^+$ and $Q^-$ respectively), expressed in mAh/g were determined via the following formulae:

$$Q^+=(Q_{cell}/\text{mtot}^+) \quad Q^-=(Q_{cell}/\text{mtot}^-)$$

As apparent from FIG. 2 (respectively curve a) for $Q^+$ and curve b) for $Q^-$ for a test at 2 mA), the Re$^+$/e$^-$ ratio has little influence on $Q^+$. As regards $Q^-$, the curve is broken down into a linear domain, wherein $Q^-$ linearly increases versus Re$^+$/e$^-$. This is compliant with theory: the negative electrode is much more capacitive than the positive electrode. By not completely inserting the negative electrode, it is possible to access a high power level. For a ratio Re$^+$/e$^-$=1, the capacities of both electrodes are identical.

EXAMPLE 3

This example aims at demonstrating the benefit of using, as a solvent, acetonitrile in the devices of the invention with view to giving it good performances, whether the electrolyte is based on a potassium salt (part a) of this example) or on a sodium salt (part b) of this example).

a) Test Conducted with a Device According to the Invention with an Electrolyte Based on a Potassium Salt In a first phase, it is proceeded with the preparation of a positive electrode and of a negative electrode.

The positive electrode is prepared by coating on an etched aluminium collector with a thickness of 30 μm a composition comprising:
- 84% of activated carbon of reference YP50F (obtained from Kuraray Chemicals Co., Japan);
- 4% of a styrene-butadiene rubber (obtained from BASF, LD417);
- 8% of carbon black of reference superC65 (obtained from Timcal Co., Switzerland);
- 4% of carboxymethylcellulose with a mass average molecular mass of 300,000 (obtained from Aldrich);

the % being mass percentages expressed based on the total mass of the electrode excluding the current collector.

The negative electrode is prepared by coating on an etched aluminium collector with a thickness of 30 μm a composition comprising:

94% of graphite of reference SLP30 (obtained from Timcal Co., Switzerland);

2% of conductive carbon VGCF (acronym corresponding to "vapour grown carbon fibre");

2% of carboxymethylcellulose at 2% (reference 7HXF at Aqualon);

2% of a dispersion with 51% of styrene-butadiene rubber (obtained from BASF under the brand LD417®), the % being mass percentages expressed based on the total mass of the electrode except for the current collector.

The aforementioned positive and negative electrodes with a surface area equal to 10.24 cm² (i.e. dimensions of 3.2×3.2 cm) are assembled in a cell of the "pouch cell" type.

The electrolyte used is a solution comprising acetonitrile comprising a potassium salt ($KPF_6$ 1M) and is used in a sufficient amount in order to impregnate the whole of the cell. The separator used is a separator in PDA25® (which corresponds to polypropylene) (obtained from Treofan GmbH, Germany) with a thickness of 25 μm.

Figure 5:
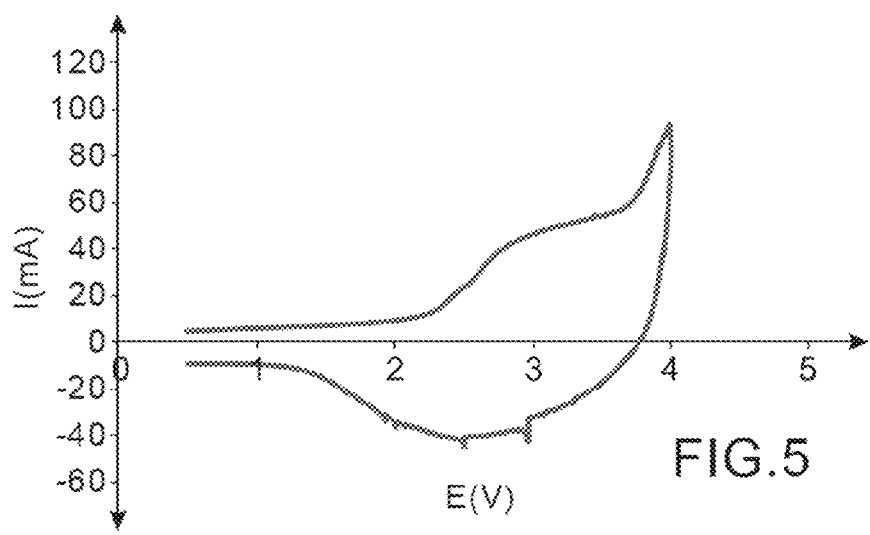
FIG. 5 is a graph illustrating the time-dependent change in the intensity I (in mA) depending on the potential E (in V) for a supercapacitor in accordance with the invention with an electrolyte comprising acetonitrile and a potassium salt compliant with part a) of Example 3.

The cell is studied by cyclic voltammetry, the results being transferred onto FIG. 5.

The area under the voltammogram is particularly large, which confirms a significant capacity of the supercapacitor, being aware that the area under the voltammogram is proportional to the capacity of the supercapacitor.

b) Test Conducted with a Device in Accordance with the Invention with an Electrolyte Based on a Sodium Salt The tested device in this part is similar to the one exemplified in part a), except for the electrolyte which is in this case a solution comprising acetonitrile and a sodium salt $NaPF_6$ (1M).

Figure 6:
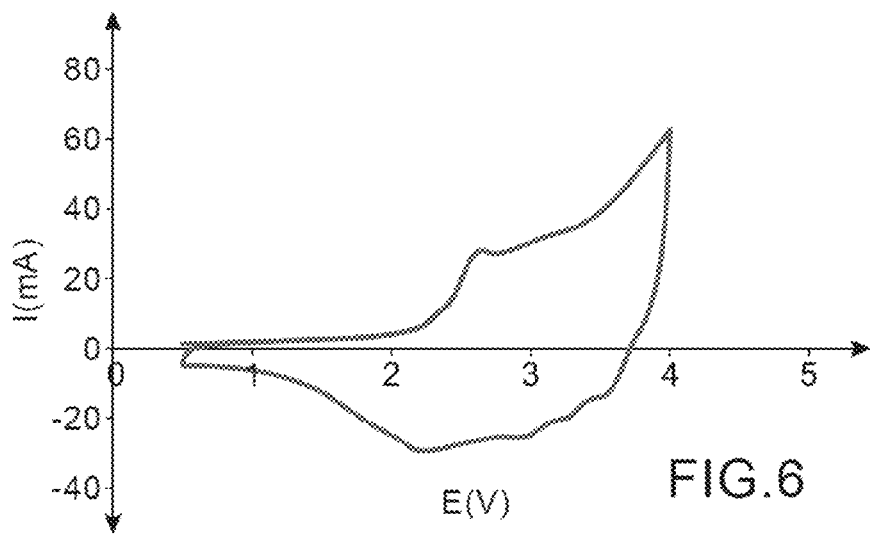
FIG. 6 is a graph illustrating the time-dependent change of the intensity I (in mA) depending on the potential E (in V) for a supercapacitor in accordance with the invention with an electrolyte comprising acetonitrile and a potassium salt compliant with part b) of Example 3.

The device is also studied by cyclic voltammetry, the results being copied onto FIG. 6.

The results show a similar trend to the one observed with the exemplified device in part a), except that the area under the voltammogram obtained with the device of part a) is larger than the one obtained with the device of part b).

EXAMPLE 4

Figure 7:
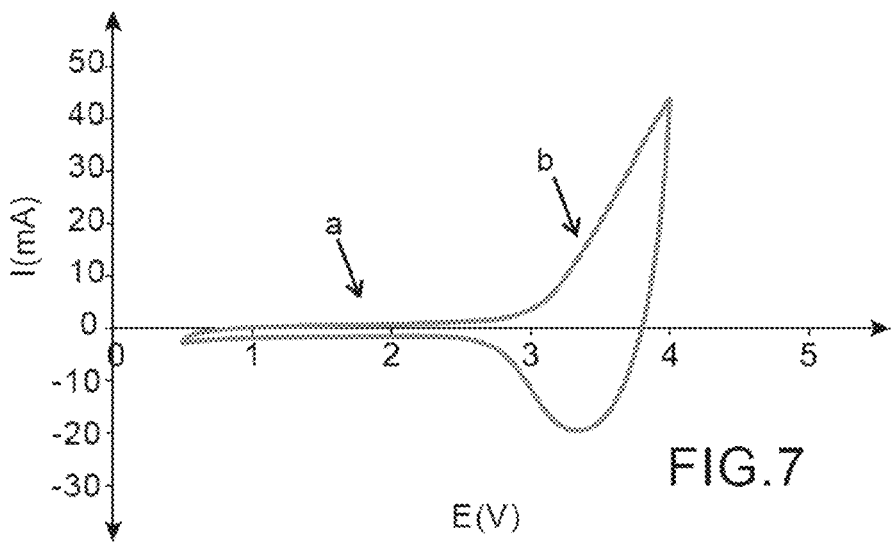
FIG. 7 is a graph illustrating a voltammogram obtained with a conventional hybrid supercapacitor.
Figure 8:
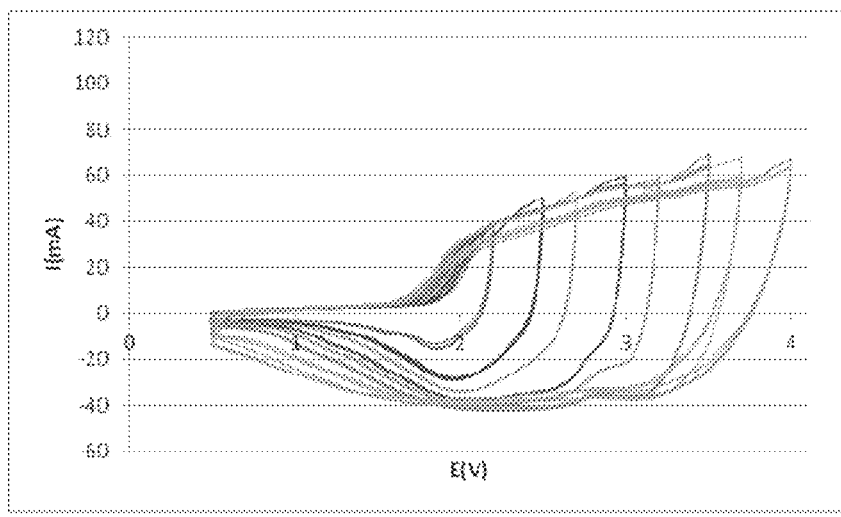
FIGS. 8 to 11 are graphs illustrating voltammograms (I (in mA) versus the potential E (in V)) for different cells of Example 4 (part a).
Figure 9:
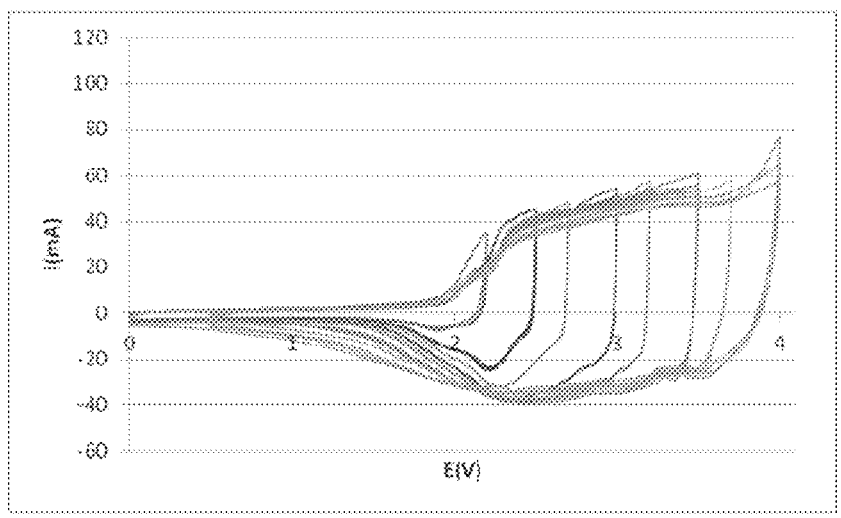
Figure 10:
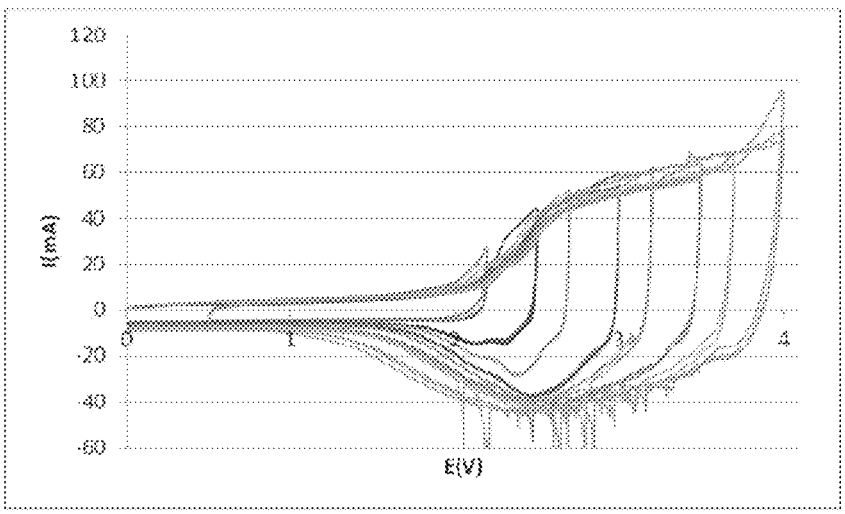
Figure 11:
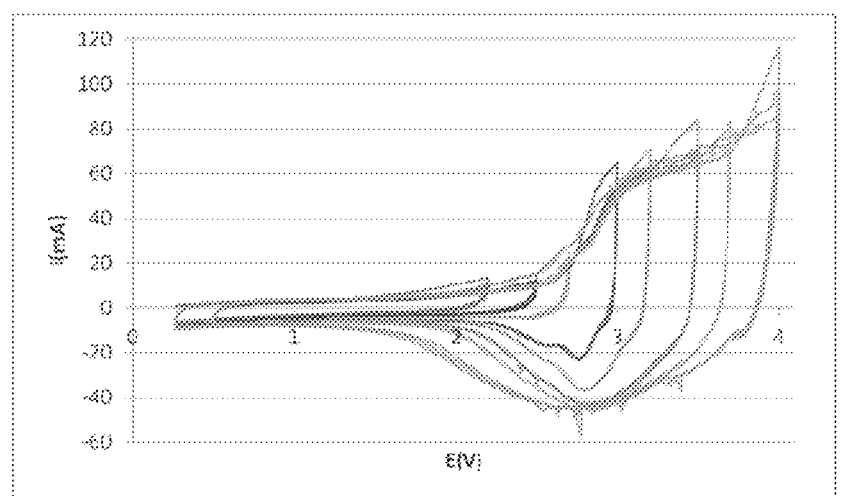

This example aims at demonstrating the influence of balancing of the electrodes of the devices of the invention, on the performances of the latter (part a) of the example) and on the stability of the latter (part b) of the example).

a) Influence of the Balancing of the Electrodes on the Performances of the Device As a preliminary remark, it is recalled, with reference to FIG. 7, which illustrates a voltammogram obtained with a hybrid supercapacitor, the conventional electrochemical behavior expected with such a supercapacitor.

In this figure, the presence of two parts may be seen (designated as part a and part b in the figure respectively), part a corresponding to the so-called "supercapacitive" part and the part b corresponding to the so-called "battery" part of the device.

Now, as the final energy of the device is proportional to the capacity and to the square of the imposed potential, it may therefore be interesting to manage to displace the operation of the device towards the "battery" part (which gives the possibility of accessing a maximum capacity) towards potentials as high as possible.

To do this, tests were carried out with devices similar to those described in paragraph a) of Example 3 (for which the salt of the electrolyte is a potassium salt $KPF_6$) comprising negative electrodes having different base weights (or surface masses), and more specifically with the following devices:

a cell, a so-called first cell, equipped with a negative electrode at 4 mg/cm³ and a positive electrode at 8 mg/cm³, which corresponds to a (positive electrode/negative electrode) ratio of 2;

a cell, a so-called second cell, equipped with a negative electrode at 6 mg/cm³ and of a positive electrode at 8 mg/cm³, which corresponds to a (positive electrode/negative electrode) ratio of 1.3;

a cell, a so-called third cell, equipped with a negative electrode at 9 mg/cm³ and with a positive electrode at 8 mg/cm³, which corresponds to a (positive electrode/negative electrode) ratio of 0.88; and a cell, a so-called fourth cell, equipped with a negative electrode at 13 mg/cm³ and with a positive electrode at 8 mg/cm³, which corresponds to a (positive electrode/negative electrode) ratio of 0.61.

These different cells are subject to cyclic voltammetry tests (from 0.5→3.2 to 0.5→4 V), the results being respectively transferred onto FIGS. 8 to 11 for the first to the fourth cell.

For the first cell (FIG. 8), as soon as the first cycle (from 0.5 to 2.2 V) occurs, the presence of a peak may be noticed showing that we are already in the "battery" part.

Conversely, for the fourth cell (FIG. 11), the first cycle (from 0.5 to 2.2 V) has a rectangular shape specific to the "supercapacitive" part, the "battery" part, as for it, only appearing during the cycle from 0.5 to 3 V, i.e. a gain of about 1V with respect to the first cell.

The second and third cells follow the same trend.

These tests show, that it is easily possible, with the devices in accordance with the invention, of moving towards the "battery" part by means of an excessive basis weight of the negative electrode with respect to the positive electrode.

b) Influence of the Balancing and of the Cycling Limits on the Stability of the System In this part, the influence of the balancing of the electrodes on the devices of the invention on the stability of the latter is studied.

To do this, tests were carried out with devices similar to those described in paragraph a) of Example 3 (for which the salt of the electrolyte is a potassium salt $KPF_6$) comprising negative electrodes having various basis weights (or surface masses), and more specifically with the following devices:

a cell, a so-called first cell, equipped with a negative electrode at 4 mg/cm³ and with a positive electrode at 8 mg/cm³, which corresponds to a (positive electrode/negative electrode) ratio of 2; and a cell, a so-called second cell, equipped with a negative electrode at 13 mg/cm³ and with a positive electrode at 8 mg/cm³, which corresponds to a (positive electrode/negative electrode) ratio of 0.61.

The aforementioned cells were tested by galvanostatic cycling from 1.5 to 3.7 V during 1,000 cycles at 20 mA.

It is seen that increasing the basis weight has an influence on the stability of the device (notably materialized by a loss of capacities at cycle 1,000 as compared with cycle 1 of more than 40% for the second cell, while it is greater than 60% for the first cell).

In order to further improve the stability, reduction in the upper operating limit of the device, by passing from 3.7 V to 3.2 V, was tested.

It was ascertained that, for a negative electrode with a basis weight of 13 mg/cm², if it is cycled up to 3.2 V, there is no current loss at the end of the three cycles (while a loss is already ascertained when cycled up to 3.7 V), as confirmed by FIG. 12 illustrating a voltammogram obtained by cycling between 1.5 and 3.2 V (3 cycles) and by cycling between 1.5 and 3.7 V (3 cycles) with the second cell.

By operating galvanostatic cycling over 1,000 cycles between 1.5 and 3.2 V, a loss of capacities of less than 10% was ascertained, which may prove to be interesting for many applications.

EXAMPLE 5

This example aims at demonstrating the safety aspect of the devices of the invention as compared with storage systems based on lithium, notably related to the following facts:
the possibility of completely discharging the devices of the invention (part a);
the possibility of doing without a passivation layer (part b);
the possibility of doing without over-dimensioning of the negative electrode with respect to the positive electrode (part c);
the possibility of dissolving solid potassium in acetonitrile.

The tested device of the invention is the one of part a) of Example 3.

a) Possibility of Completely Discharging the Devices According to the Invention

In the case of a storage system based on lithium, it is not possible to completely discharge the system, which implies that there exists energy loaded into the system and it therefore is a potential risk related to safety.

In the case of the tested device of the invention, in order to make sure that it is possible to completely discharge the device, it was proceeded with three cycles from 0.5 to 3.2 V and then with three cycles from 0 to 3.2 V.

As confirmed in FIG. 13, illustrating the voltammogram of the test mentioned above, discharging the device completely has no influence on the performances of the latter, in the sense that the device has the same capacity during the following cycles.

Further, a "post-mortem" study of the device, i.e. after opening the latter and visually inspecting these different elements, gave the possibility of asserting that none of the elements was subject to degradation subsequent to complete discharge of the latter.

As a conclusion, the possibility of completely discharging the system represents a non-negligible advantage, for example, in the case when it is absolutely necessary to directly intervene on the device.

b) Possibility of Omitting a Passivation Layer

In the case of a system based on lithium, one of the safety problems is related to the requirement of forming a passivation layer at the negative electrode. The generally applied solution consists of applying an additional lithium sheet for saturating the system with lithium ions, the majority of which is consumed during the first cycles. This application poses safety problems and significant overcost.

In the case of the device of the invention, it is not necessary to require the formation of a passivation layer, which has an advantage from the point of view of safety.

c) Possibility of Doing without Over-Dimensioning of the Negative Electrode with Respect to the Positive Electrode In the case of a system based on lithium, with view to doing without the optional deposition of lithium metal at the surface of the negative electrode, it is customary to over-dimension the negative electrode.

In the case of the devices of the invention, a test was carried out by over-dimensioning the negative electrode (35*35 mm instead of 32*32 mm for the positive electrode). This test did not show any difference in terms of performances, which further is another advantage of the devices of the invention.

d) Possibility of Dissolving Solid Potassium in Acetonitrile

The use of acetonitrile certainly has an advantage, in the sense that it gives the possibility, because of the nature of the potassium in the latter, of getting rid of the risk related to the deposition of solid potassium at the surface of the electrode.

The invention claimed is:

1. A hybrid supercapacitor device comprising at least one cell comprising:
a porous positive electrode comprising activated carbon;
a negative electrode comprising, as an active material, a carbonaceous material capable of inserting an alkaline element other than lithium, this carbonaceous material being different from the activated carbon used at the positive electrode; and
a non-aqueous electrolyte comprising a salt selected from among salts of an alkaline metal other than lithium.

2. The device according to claim 1, wherein the salts of alkaline metal other than lithium are selected from among sodium salts, potassium salts, rubidium salts, cesium salts and mixtures thereof.

3. The device according to claim 1, wherein the salts of alkaline metal other than lithium are selected from among sodium salts, potassium salts and mixtures thereof.

4. The device according to claim 1, wherein the activated carbon is present, in the positive electrode, at a content of at least 60% by mass based on the total mass of the electrode.

5. The device according to claim 1, wherein the carbonaceous material capable of inserting an alkaline element other than lithium is a carbonaceous material comprising graphite.

6. The device according to claim 1, wherein the positive electrode and the negative electrode comprise at least one organic binder selected from among polymeric binders.

7. The device according to claim 6, wherein the polymeric binders comprise one or several polymers selected from fluorinated polymers, polyimides, polyacrylonitriles and mixtures thereof.

8. The device according to claim 1, wherein the positive electrode further comprises an electrically conductive carbonaceous additive other than activated carbon, selected from among carbon blacks, acetylene blacks, graphite, carbon nanotubes, carbon fibers and mixtures thereof.

9. The device according to claim 1, wherein the negative electrode further comprises an electrically conductive carbonaceous additive other than activated carbon, capable of inserting as defined in claim 1, selected from among carbon blacks, acetylene blacks, graphite, carbon nanotubes, carbon fibers and mixtures thereof.

10. The device according to claim 8, wherein said electrically conductive carbonaceous additive is present in a content ranging up to 15% by mass based on the total mass of the positive or negative electrode.

11. The device according to claim 1, wherein the salt is a sodium salt selected from among $NaClO_4$, $NaBF_4$, $NaPF_6$, sodium bis(trifluoromethanesulfonyl)imide, sodium bis(fluorosulfonyl)imide, sodium bis(oxalato)borate, NaSCN, $NaSbF_6$, $NaAsF_6$, $NaAlCl_4$, $NaSiF_6$, $NaSO_3CF_3$ and mixtures thereof.

12. The device according to claim 1, wherein the salt is a potassium salt selected from among $KClO_4$, $KBF_4$, $KPF_6$, potassium bis(trifluoromethanesulfonyl)imide, potassium bis(fluorosulfonyl)imide, potassium bis(oxalato)borate, KSCN, $KSbF_6$, $KAsF_6$, $KAlCl_4$, $KSiF_6$, $KSO_3CF_3$ and mixtures thereof.

13. The device according to claim 1, wherein the salt(s) present in the electrolyte is(are) in solution in at least one organic solvent.

14. The device according to claim 13, wherein the organic solvent(s) is(are) selected from among nitrile solvents, carbonate solvents, lactones solvents, sulfone solvents, lactam solvents, amide solvents, ketone solvents, nitroalkane solvents, amine solvents, sulfoxide solvents, ester solvents, linear ether solvents, cyclic ether solvents, oxazolidone solvents and mixtures thereof.

15. The device according to claim 1, wherein, when the electrolyte comprises at least one sodium salt, the electrolyte comprises a salt selected from among $NaClO_4$, $NaPF_6$, $NaBF_4$ and mixtures thereof, in solution in at least one solvent selected from among carbonate solvents, linear ether solvents, nitrile solvents, lactones solvents, amide solvents and mixtures thereof.

16. The device according to claim 15, wherein, when the electrolyte comprises at least one sodium salt, the electrolyte comprises at least one sodium salt selected from among $NaClO_4$, $NaPF_6$, $NaBF_4$ and mixtures thereof, in solution in at least one solvent selected from among propylene carbonate, ethylene carbonate, diethyl carbonate, dimethyl carbonate, dimethoxyethane, acetonitrile, γ-butyrolactone, dimethylformamide and mixtures thereof.

17. The device according to claim 15, wherein, when the electrolyte comprises at least one sodium salt, the electrolyte comprises, as a sodium salt, $NaClO_4$, $NaPF_6$ or $NaBF_4$ in solution in a solvent or a mixture of solvents consisting of:
propylene carbonate alone;
a ethylene carbonate/diethyl carbonate (1:1) mixture;
a ethylene carbonate/dimethyl carbonate (1:1) mixture;
a dimethoxyethane/propylene carbonate (1:2) mixture;
acetonitrile alone;
γ-butyrolactone alone; or
dimethylformamide alone.

18. The device according to claim 1, wherein, when the electrolyte comprises at least one potassium salt, the electrolyte comprises at least one potassium salt selected from among $KClO_4$, $KPF_6$, $KBF_4$ and mixtures thereof, in solution in at least one solvent selected from among carbonate solvents, linear ether solvents, nitrile solvents, lactone solvents, amide solvents and mixtures thereof.

19. The device according to claim 18, wherein, when the electrolyte comprises at least one potassium salt, the electrolyte comprises at least one potassium salt selected from among $KClO_4$, $KPF_6$, $KBF_4$ and mixtures thereof, in solution in at least one solvent selected from among propylene carbonate, ethylene carbonate, diethyl carbonate, dimethyl carbonate, dimethoxyethane, acetonitrile, γ-butyrolactone, dimethylformamide and mixtures thereof.

20. The device according to claim 18, wherein, when the electrolyte comprises at least one potassium salt, the electrolyte comprises, as a potassium salt, $KClO_4$, $KPF_6$ or $KBF_4$ in solution in a solvent or a mixture of solvents consisting of:
propylene carbonate alone;
a ethylene carbonate/diethyl carbonate (1:1) mixture;
a ethylene carbonate/dimethyl carbonate (1:1) mixture;
a dimethoxyethane/propylene carbonate (1:2) mixture;
acetonitrile alone;
γ-butyrolactone alone; or
dimethylformamide alone.

21. The device according to claim 13, wherein the organic solvent is acetonitrile.

22. The device according to claim 1, wherein said negative electrode and said positive electrode are each associated with an electrically conductive current collector.

23. The device according to claim 22, wherein the electrically conductive current collector comprises aluminium.

24. The device according to claim 22, wherein, when the electrically conductive current collector comprises copper, the electrolyte does not contain any acetonitrile.

* * * * *